(12) United States Patent
Winterstein (10) Patent No.: US 9,407,866 B2
(45) Date of Patent: Aug. 2, 2016

(54) JOINING AN ELECTRONIC CONFERENCE IN RESPONSE TO SOUND

(71) Applicant: Citrix Systems, Inc., Fort Lauderdale, FL (US)

(72) Inventor: Florian Winterstein, Rolling Hills Est., CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 408 days.

(21) Appl. No.: 13/897,736

(22) Filed: May 20, 2013

(65) Prior Publication Data

US 2014/0340468 A1 Nov. 20, 2014

(51) Int. Cl.
| | |
|---|---|
| G06F 17/00 | (2006.01) |
| H04N 7/15 | (2006.01) |
| H04N 7/14 | (2006.01) |
| H04W 12/04 | (2009.01) |
| H04M 3/56 | (2006.01) |

(52) U.S. Cl.
CPC ............... H04N 7/15 (2013.01); H04N 7/147 (2013.01); H04W 12/04 (2013.01); H04M 3/56 (2013.01)

(58) Field of Classification Search
CPC .............. H04M 3/568; H04M 1/72566; H04L 12/1822; H04L 65/403; H04L 12/1818; H04L 67/325; H04N 7/15

USPC .................................................... 700/94
See application file for complete search history.

(56) References Cited

U.S. PATENT DOCUMENTS

| | | | |
|---|---|---|---|
| 2002/0103864 A1* | 8/2002 | Rodman et al. | 709/204 |
| 2007/0263082 A1* | 11/2007 | Tamaru et al. | 348/14.08 |
| 2008/0084985 A1* | 4/2008 | Diethorn | H04M 3/16 379/202.01 |
| 2012/0245722 A1 | 9/2012 | Yamamura | |
| 2012/0317297 A1 | 12/2012 | Bailey | |
| 2015/0264314 A1* | 9/2015 | Goesnar | H04L 12/1818 348/14.08 |

\* cited by examiner

Primary Examiner — Joseph Saunders, Jr.
(74) Attorney, Agent, or Firm — BainwoodHuang (57) ABSTRACT

A technique joins an electronic device to an electronic conference hosted by a conference server. The technique involves sensing, by the electronic device, sound input. The technique further involves receiving, by the electronic device, sound from a sound initiating device (e.g., a primary device of a user). The technique further involves automatically establishing, based on the sound received from the sound initiating device, a communications channel from the electronic device (e.g., a helper device of the user) to the electronic conference hosted by the conference server to enable a user of the electronic device to participate in the electronic conference through the communications channel by using the electronic device. Once the electronic device has joined the electronic conference, a user can operate the electronic device in a variety of ways to enhance the overall experience, e.g., as a control panel to replace a control panel of the sound initiating device.

22 Claims, 6 Drawing Sheets

JOINING AN ELECTRONIC CONFERENCE IN RESPONSE TO SOUND

BACKGROUND

In general, an online meeting (or web conference) involves communications between multiple client computers and a meeting server. Typically, each client computer sends audio and video input (e.g., captured via a microphone and a webcam) to the meeting server, and receives audio and video output (e.g., presented via speakers and a display) from the meeting server.

To create an online meeting, a meeting organizer typically sends invitations (e.g., email messages, calendar invites, etc.) containing a link to the online meeting to one or more meeting invitees. To start the online meeting, the meeting organizer connects the organizer's client computer to the meeting server. To join the online meeting, the invitees click on the link within the invitations. When an invitee clicks on the link, (i) the invitee's browser application connects to the meeting server and (ii) properly identifies the specific online meeting to the meeting server thus enabling the meeting server to join the invitee to the specific online meeting. Some invitees connect to online meetings using smart phones, tablet devices, or even regular telephones.

SUMMARY

Unfortunately, there are deficiencies to the above-described conventional approach to connecting a client computer to an online meeting. In particular, suppose that a presenter at an online meeting decides during the online meeting to change some of the operating parameters of the online meeting. For example, the presenter may wish to lower the volume of (or perhaps even mute) a particular audio feed from one of the invitees. As another example, the presenter may wish to take a picture of a whiteboard and share that picture with the participants of the online meeting. In these situations, the presenter may try to operate the existing controls of the presenter's client computer, e.g., the presenter's keyboard, the presenter's webcam, and so on.

However, such operation may be awkward, cumbersome or even impossible due to equipment limitations. For example, in connection with volume control, if the presenter is using the keyboard or mouse to control a slide show or perform tasks on a desktop, the presenter may need to use the same keyboard and/or mouse for volume control. Such volume control operation burdens the keyboard and mouse with additional functionality as well as further crowds the presenter's interface (e.g., the presenter's desktop controls).

Similarly, in connection with taking a picture, the presenter's client computer may not have a camera or the camera of the presenter's client computer may be built into the monitor or combined with the microphone thus requiring the presenter to move more than just the camera to properly aim the camera. Moreover, wiring (e.g., cable length) or other physical restrictions (e.g., the angle or location of the camera relative to the whiteboard) may limit the presenter's ability to capture a good image.

As a possible improvement, the presenter may be able to connect a second client computer such as a tablet or smart phone to the online meeting and then control various aspects of the presentation using the second client computer. Unfortunately, the traditional approach of joining an online meeting by sending an invitation containing a link and connecting the second client computer to the meeting by clicking the link in the invitation is burdensome and time consuming. As an alternative, the presenter may be able to join the second client computer by navigating a browser application running on the second client computer to a website and manually typing in a meeting code, but this manual endeavor may require even more effort and time. Moreover, once the second client computer is connected, the presenter then needs to manually transfer presenter control from the presenter's first client computer to the presenter's second client computer.

In contrast to the above-described conventional approaches to joining a client computer to an online meeting, improved techniques are directed to joining an electronic device to an electronic conference using sound. In particular, a sound initiating device such as a user endpoint device which has already joined the electronic conference can output an acoustic signal to a listening device (e.g., a tablet, a smart phone, a laptop, etc.). In response to the acoustic signal, the listening device can automatically join the electronic conference to facilitate meeting operation (e.g., to operate as a detached control panel, to capture audio or video, etc.). For example, suppose that a user currently connects to an electronic conference using a primary device such as a general purpose computer, but that the user wishes to take advantage of certain features that are not available on the primary device but are available on a helper device such as a smart phone or a tablet. For instance, the user may with to run a special control panel application on the helper device which automatically assumes control of the electronic conference and enables the user to take advantage of various specialized features of the helper device (e.g., a touch pad, a camera, wireless mobility, etc.) that may not be available on the primary device. Such joining via sound simplifies the process of including a new device to help with an electronic conference, and enables a user to make use of various components of this helper device to enhance the overall experience (e.g., ergonomics of a touch pad to control aspects of the electronic conference, mobility of a smart phone camera to capture images, etc.).

One embodiment is directed to a method of joining an electronic device to an electronic conference hosted by a conference server. The method includes sensing, by the electronic device, sound input. The method further includes receiving, by the electronic device, sound from a sound initiating device (e.g., a primary device of a user). The method further includes automatically establishing, based on the sound received from the sound initiating device, a communications channel from the electronic device (e.g., a helper device of the user) to the electronic conference hosted by the conference server to enable a user of the electronic device to participate in the electronic conference through the communications channel by using the electronic device. Once the electronic device has joined the electronic conference, a user can operate the electronic device in a variety of ways to enhance the overall experience, e.g., as a control panel to replace a control panel of the sound initiating device, etc.

In some arrangements, receiving the sound from the sound initiating device includes receiving an acoustic signal from the sound initiating device. The acoustic signal includes a sequence of audio tones (e.g., a pattern of beeps carrying data).

In some arrangements, the conference server is constructed and arranged to manage multiple electronic conferences simultaneously. Each electronic conference (i) connects together a respective group of users and (ii) is uniquely identified by a meeting identifier. In these arrangements, the sequence of audio tones of the acoustic signal can define a particular meeting identifier which identifies a particular electronic conference. Additionally, establishing the communications channel from the electronic device to the electronic conference hosted by the conference server includes providing, to the conference server, a join meeting command which includes the particular meeting identifier to direct the conference server to join the electronic device to the particular electronic conference among the multiple electronic conferences based on the particular meeting identifier.

In some arrangements, prior to receiving the sound from the sound initiating device, the sound initiating device participates as a user endpoint in the particular electronic conference. In these arrangements, the method may further include, prior to receiving the sound from the sound initiating device, playing a sequence of beeps from the electronic device to the sound initiating device to direct the sound initiating device to output the acoustic signal which includes the sequence of audio tones sequence of audio tones defining the particular meeting identifier.

In some arrangements, establishing the communications channel from the electronic device to the electronic conference hosted by the conference server includes, in response to the acoustic signal which includes the sequence of audio tones, querying a scheduling server to obtain a particular meeting identifier which identifies a particular electronic conference, and providing, to the conference server, a join meeting command which includes the particular meeting identifier to direct the conference server to join the electronic device to the particular electronic conference among the multiple electronic conferences based on the particular meeting identifier.

In some arrangements, querying the scheduling server to obtain the particular meeting identifier includes providing a user identifier and a timestamp from the electronic device to the scheduling server. The user identifier identifies a particular user among multiple users. Additionally, the timestamp identifies a particular meeting time. Furthermore, the scheduling server accesses a particular meeting schedule for the particular user based on the user identifier. Also, the scheduling server (i) selects a particular scheduled meeting from multiple scheduled meetings on the particular meeting schedule based on a comparison between the timestamp and the multiple scheduled meetings on the particular meeting schedule and (ii) provides the particular meeting identifier back to the electronic device, the particular meeting identifier identifying the particular scheduled meeting among the multiple scheduled meetings.

In some arrangements, the electronic conference is an online meeting. In these arrangements, the sound initiating device can be a first meeting endpoint device of the online meeting. Additionally, establishing the communications channel from the electronic device to the electronic conference hosted by the conference server includes joining the electronic device as a second meeting endpoint device of the online meeting, each meeting endpoint device exchanging electronic signals with the conference server during the online meeting.

In some arrangements, the first meeting endpoint device includes an electronic display which outputs a presentation of the online meeting. The second meeting endpoint device includes a touch screen. Additionally, in these arrangements, the method can further include obtaining user commands via the touch screen of the second meeting endpoint device to control the presentation of the online meeting output on the electronic display of the first meeting endpoint device.

In some arrangements, the first meeting endpoint device includes an electronic display which outputs a presentation of the online meeting. The second meeting endpoint device includes a camera. Additionally, in these arrangements, the method can further include capturing a set of images using the camera of the second meeting endpoint device, and including the set of images in the presentation of the online meeting output on the electronic display of the first meeting endpoint device.

In some arrangements, the first meeting endpoint device communicates with the conference server through a first network connection. Joining the electronic device as the second meeting endpoint device of the online meeting includes creating, as the communications channel between the electronic device and the conference server, a second network connection that is independent of the first network connection.

It should be understood that, in the cloud context, various electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in joining an electronic device to an electronic conference in response to sound.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to joining an electronic device to an electronic conference in response to sound. In particular, a sound initiating device such as a user endpoint device which has already joined the electronic conference can output an acoustic signal to a listening device (e.g., a tablet, a smart phone, a laptop, etc.). In response to the acoustic signal, the listening device can automatically join the electronic conference to facilitate meeting operation (e.g., to operate as a detached control panel, to capture audio or video, etc.). For example, suppose that a user currently connects to an electronic conference using a primary device such as a general purpose computer, but that the user wishes to take advantage of certain features that are not available on the primary device but that are available on a helper device such as a smart phone or a tablet. For instance, the user may wish to run a special control panel application on the helper device which automatically assumes control of the electronic conference and enables the user to take advantage of various specialized features of the helper device (e.g., a touch pad, a camera, wireless mobility, etc.) that may not be available on the primary device. Such joining in response to sound simplifies the process of including a new helper device with the electronic conference, and enables a user to make use of various components of the helper device to enhance the overall experience (e.g., ergonomics of a touch pad to control aspects of the electronic conference, mobility of a smart phone camera to capture images, etc.).

Figure 1:
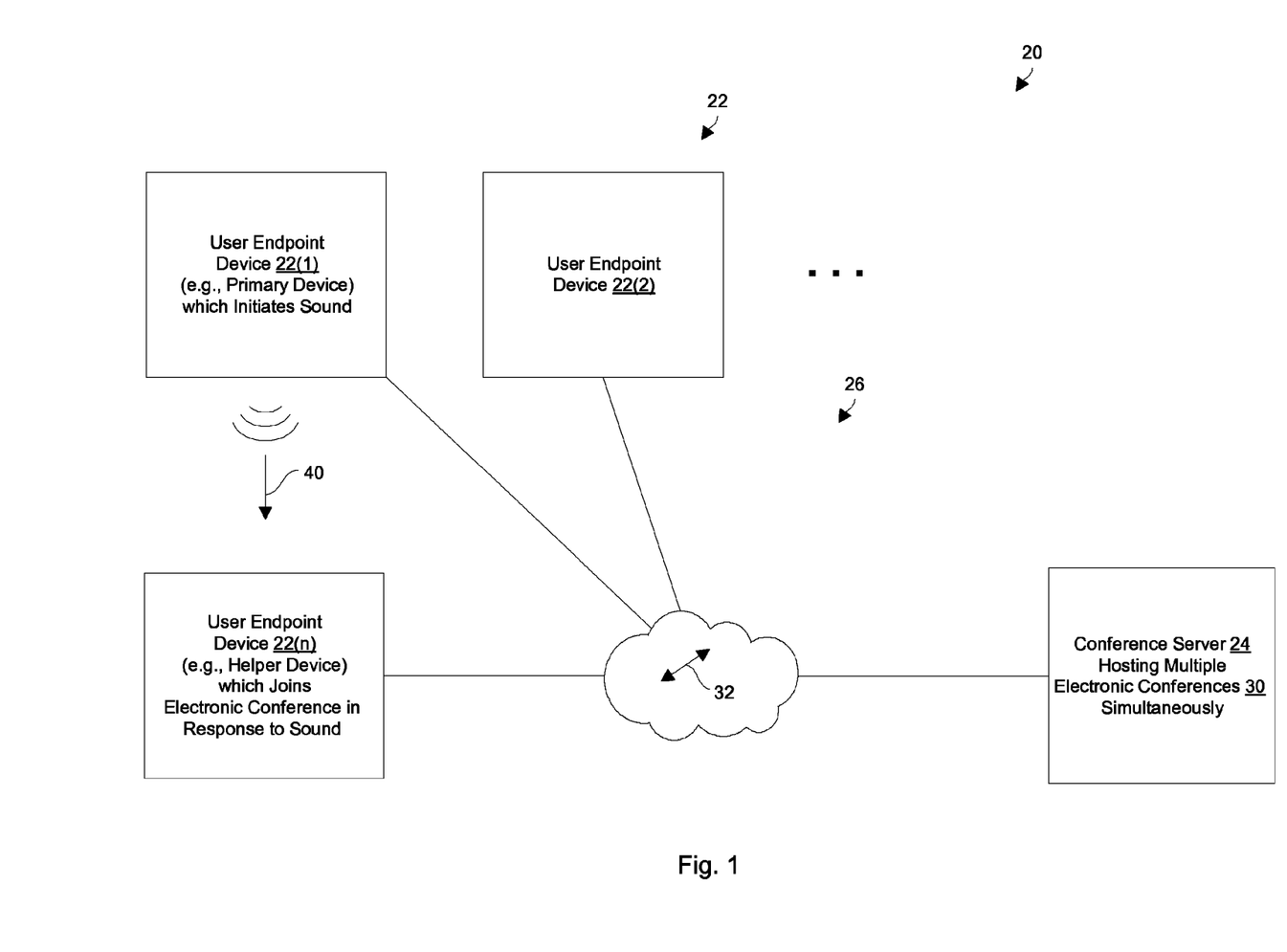
FIG. 1 is a block diagram of an electronic environment within which an electronic device joins an electronic conference in response to sound.

FIG. 1 shows an electronic environment 20 within which an electronic device joins an electronic conference in response to sound. The electronic environment 20 includes user endpoint devices 22(1), 22(2), . . . 22(n) (collectively, user endpoint devices 22), a conference server 24, and a communications medium 26.

Each user endpoint device 22 is capable of operating as a conference client which joins and participates in electronic conferences hosted by the conference server 24. By way of example, the user endpoint device 22(1) may reside at a first location and operate on behalf of a first conference participant (or user), the user endpoint device 22(2) may reside at a second location and operate on behalf of a second conference participant, and so on.

The conference server 24 is capable of hosting and managing multiple electronic conferences 30 simultaneously. In particular, for each electronic conference 30, the conference server 24 is capable of (i) receiving an audio feed and a video feed from the user endpoint device 22 of each participant of that electronic conference 30, and (ii) returning an audio feed (e.g., an aggregate audio feed) and a video feed (e.g., an aggregate video feed) to the user endpoint device 22 of each participant.

The communications medium 26 is constructed and arranged to connect the various components of the electronic environment 20 together to enable these components to exchange electronic signals 32 (e.g., see the double arrow 32). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 32 is capable of supporting different types of communications such as Ethernet signals, cellular signals, plain old telephone system (POTS) signals, combinations thereof, and so on.

It should be understood that the sound which enables an electronic device 22 to join an electronic conference 30 possesses certain audio attributes which enables that sound to be discerned and distinguished from everyday speech and common sounds (e.g., background music, street or environmental noise, etc.). Suitable sound for use in joining an electronic conference 30 is an acoustic signal 40 which includes a series of audio tones (e.g., a specific pattern of beeps, tones, etc.). Such a discernable acoustic signal 40 prevents the electronic device 22 from inadvertently attempting to join electronic conferences 30 simply in response to stray or ambient noises.

For an electronic device 22 to join an electronic conference 30 in response to sound, the electronic device 22 is configured as a listening device to detect the acoustic signal 40 (e.g., see the user endpoint device 22(n) in FIG. 1). For example, the electronic device 22 may be equipped with a microphone to receive audio input and processing circuitry to identify the acoustic signal 40 within the received audio input.

Additionally, another electronic device 22 is configured as a sound initiating device to provide the acoustic signal 40 (e.g., see the user endpoint device 22(1) in FIG. 1). For example, this other electronic device 22 may be equipped with processing circuitry and a speaker to generate and output the acoustic signal 40.

It should be understood that any type of electronic device 22 may operate as a listening device which joins an electronic conference 30 in response to the acoustic signal 40 (e.g., a smart phone, a tablet, a laptop computer, a user workstation, a general purpose computer, etc). Likewise, any type of electronic device 22 may operate as a sound initiating device which provides the acoustic signal 40 to the listening device (e.g., a smart phone, a tablet, a laptop computer, a user workstation, a general purpose computer, etc.).

Details of how an electronic device 22 joins an electronic conference 30 in response to sound will now be provided. By way of example only, suppose that the user endpoint device 22(1) (FIG. 1) is a standard computer which is provisioned with a mouse, keyboard and monitor. Further suppose that the user of the user endpoint device 22(1) joins (or starts) an electronic conference 30 such as by clicking a pointer of the mouse over a link in an email message or calendar entry. In such a situation, the standard computer establishes a connection to the conference server 24 and joins the electronic conference 30. The link may include identification data such as a conference ID which, upon receipt by the conference server 24, enables the conference server 24 to properly select the electronic conference 30 among multiple electronic conferences 30 served by the conference server 24. Other users may operate other user endpoint devices 22 to participate in the electronic conference 30 as well (e.g., see the user endpoint device 22(2) in FIG. 1).

In this example, further suppose that the user endpoint device 22(n) is a mobile device such as a tablet or smartphone. Also suppose that, after the user has joined the user endpoint device 22(1) to the electronic conference 30, the user wishes to join the user endpoint device 22(n) to the same electronic conference 30. For example, the user may want to present during the electronic conference 30, and may consider it easier to control the presentation using a touch screen of the user endpoint device 22(n).

To join the user endpoint device 22(n) to the same electronic conference 30, the user simply launches a control panel (or listening) application on the user endpoint device 22(n) and directs the user endpoint device 22(1) to output the acoustic signal 40 while the user endpoint device 22(n) is within range to receive the acoustic signal 40. Launching of the control panel application on the user endpoint device 22(n) causes the user endpoint device 22(n) to enter an initial ready (or detection) mode in which the user endpoint device 22(n) is standing by to join an electronic conference 30. Outputting the acoustic signal 40 from the user endpoint device 22(1) while the user endpoint device 22(n) is within range commands the user endpoint device 22(n) to automatically join the electronic conference 30.

It should be understood that there are various ways that an electronic conference 30 can be properly identified to a listening device to enable that listening device to join the electronic conference 30. A few of example ways will now be described.

One way to properly identify an electronic conference 30 to a listening device involves establishing a common context between the listening device and the sound initiating device. Along these lines, when the sound initiating device outputs the acoustic signal 40 to the listening device (e.g., a patterns of beeps which is recognized by the listening device), both devices may record a timestamp and a physical location of the event (e.g., using GPS circuitry, based on network addresses, etc.). The devices can then communicate the timestamps and their physical locations to the conference server 24 which automatically matches the listening device to a particular electronic conference 30 and joins the listening device to that conference 30.

Another way to properly identify an electronic conference 30 to a listening device involves providing an exchange of information between the sound initiating device and the listening device. For example, the listening device may be directed to join an electronic conference 30 based on conference information associated with a particular device ID, or conference information stored in a particular directory/path/ etc., on a lookup server. Once the listening device accesses this conference information, the listening device joins a particular electronic conference based on this conference information.

Yet another way to properly identify an electronic conference 30 to a listening device involves providing a conference identifier (ID) within the acoustic signal 40 which is sent from the sound initiating device and received by the listening device. Once the listening device has the conference ID, the listening device simply presents the conference ID to the conference server 24 and the conference server 24 automatically joins the listening device to the particular electronic conference 30 identified by that conference ID.

At this point, both the user endpoint device 22(1) and the user endpoint device 22(n) are under control of the user. The user endpoint device 22(1) which initiated the acoustic signal 40 is capable of operating as either a primary device or a helper device of the user. For example, as a primary device, the user endpoint device 22(1) enables the user to observe the presentation in the same manner as that of the other participants of the electronic conference 30 (e.g., see the user endpoint device 22(2) in FIG. 1). In particular, if the user endpoint device 22(1) is a standard computer, the user endpoint device 22(1) may include a suitably sized monitor or perhaps a display port to control a projector which allows the user easily view the presentation.

Additionally, the user endpoint device 22(n) which received the acoustic signal 40 is capable of operating as either a primary device or a helper device of the user, i.e., to enable the user to effectively control the presentation. For example, as a helper device, the user endpoint device 22(n) may be a mobile device which is equipped with a touch screen. In this situation, the user is now able to control the presentation with the luxury of an auxiliary apparatus which does not interfere with the presentation rendered by the primary device. Moreover, the touch screen of the user endpoint device 22(n) allows the user to control the presentation without the restrictions imposed by a standard mouse and keyboard (i.e., the user is able to input complex commands via detection of advanced figure movements on the touch screen). Furthermore, the wireless aspect of the mobile device enables the user to move in an unhindered manner (e.g., without fussing with cables or struggling in a fixed location). Accordingly, the easy addition of the user endpoint device 22(n) in response to sound enhances the overall user experience. Further details will now be provided with reference to FIGS. 2 and 3.

Figure 2:
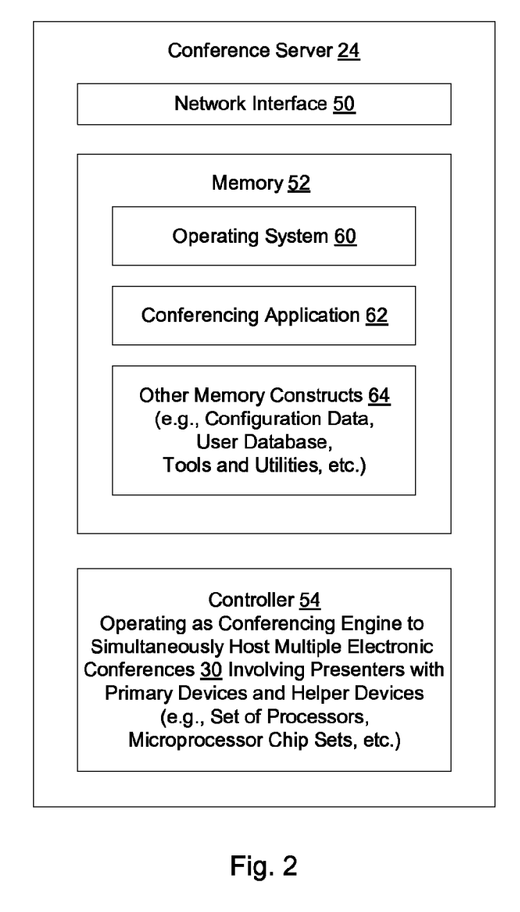
FIG. 2 is a block diagram of a conference server of the electronic environment.
Figure 3:
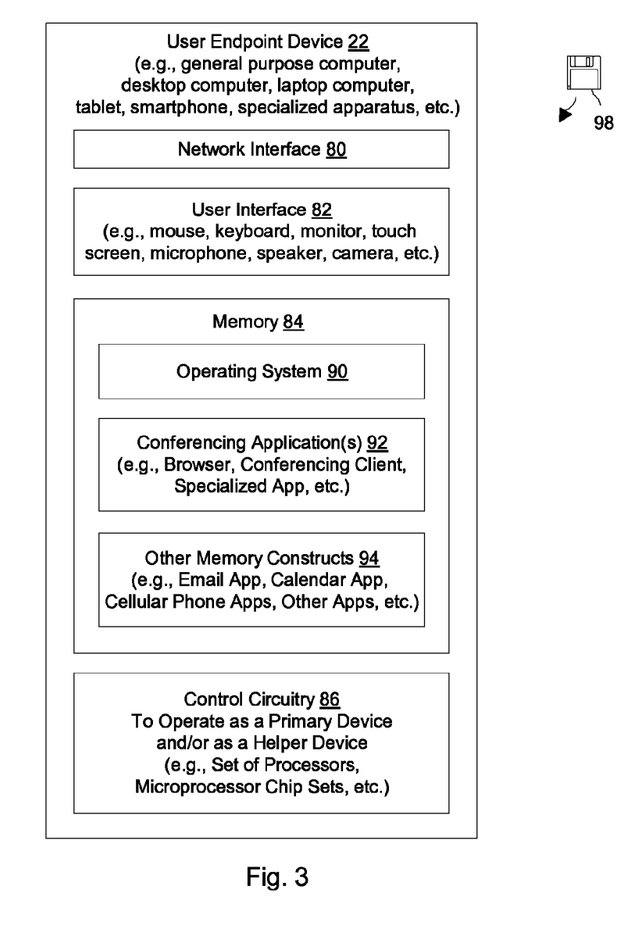
FIG. 3 is a block diagram of a user endpoint device of the electronic environment.

FIGS. 2 and 3 show particular components of the electronic environment 20. In particular, FIG. 2 shows details of the conference server 24. Additionally, FIG. 3 shows details of a user endpoint device 22.

With reference to FIG. 2, the conference server 24 includes a network interface 50, memory 52 and a controller 54. Such a conference server 24 may be under control of and operated by an enterprise's infrastructure (e.g., an IT department) or by a third-party (e.g., as a subscription to a conferencing service provided by a service provider).

The network interface 50 is constructed and arranged to connect the conference server 24 to the communications medium 26 (also see FIG. 1). Accordingly, the network interface 50 enables the conference server 24 to communicate with the other components of the electronic environment 20 (e.g., the user endpoint devices 22). Such communications may be copper-based or wireless (i.e., IP-based, cellular, POTS-based, combinations thereof, and so on).

The memory 52 is intended to represent both volatile storage (e.g., DRAM, SRAM, etc.) and non-volatile storage (e.g., flash memory, magnetic disk drives, etc.). The memory 52 stores a variety of software constructs including an operating system 60, a conferencing application 62, and other memory constructs 64 (e.g., configuration data, a user database, tools and utilities, and so on. The operating system 60, when executed by the controller 54, manages various resources of the conference server 24 (e.g., memory allocation, processing cycles, etc.). The conferencing application 62, when executed by the controller 54, provides conferencing services enabling users to create, conduct and close electronic conferences 30. The other memory constructs 64 support the operation of the conference server 24, e.g., control user accounts and validation, impose operating limits and thresholds, and so on.

The controller 54 is constructed and arranged to operate in accordance with the various software constructs stored in the memory 52. The controller 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 68 is capable of delivering all or portions of the software to the conference server 24. The computer program product 68 has a non-transitory (or non-volatile) computer readable medium which stores a set of instructions which controls one or more operations of the conference server 24. Examples of suitable computer readable storage media include tangible articles of manufacture and apparatus which store instructions in a non-volatile manner such as CD-ROM, flash memory, disk memory, tape memory, and the like.

During operation, the controller 54 executes the conferencing application 62 to form a conferencing engine which is capable of hosting multiple electronic conferences 30 simultaneously. For each electronic conference 30, the conferencing engine establishes connections to user endpoint devices 22, receives individual audio feeds and video feeds from the user endpoint devices 22 through the connections, and provides an audio feed (e.g., an aggregate audio feed) and a video feed (e.g., an aggregate video feed) back to the user endpoint devices 22 through the connections. During such electronic conferences 30, presenters are able to control various aspects of the conferences from their user endpoint devices 22 (e.g., enter commands to volume control, display of content, etc.).

In some arrangements, the conference server 24 resides in a clustered computing environment (i.e., within a cluster of computing nodes or within a server farm) for load balancing and fault tolerance. In some arrangements, the computing nodes are distributed (e.g., among a campus, among different cities, within the cloud, etc.). In some arrangements, the conference server 24 operates within a virtualized environment, e.g., within one or more virtual machines. Further details will now be provided with reference to FIG. 3.

With reference to FIG. 3, the user endpoint device 22 includes a network interface 80, a user interface 82, memory 84 and control circuitry 86. Such a user endpoint device 22 may come in a variety of form factors such as a general purpose computer, a desktop computer, a laptop or notebook computer, a tablet device, a smartphone, a specialized apparatus, combinations thereof, and so on.

The network interface 80 is constructed and arranged to connect the user endpoint device 22 to the communications medium 26 (also see FIG. 1). Accordingly, the network interface 80 enables the user endpoint device 22 to communicate with the other components of the electronic environment 20 (e.g., other user endpoint devices 22, the conference server 24, etc.). Such communications may be copper-based or wireless (i.e., IP-based, cellular, POTS-based, combinations thereof, and so on).

The user interface 82 is constructed and arranged to receive input from a user and provide output to the user. In the context of a user workstation or a general purpose computer, the user interface 42 may include a keyboard, a mouse, a microphone and a webcam for user input, and a monitor and a speaker for user output. In the context of a tablet or a similar mobile device, the user interface 42 may include mobile phone components (e.g., a microphone and a speaker) and a touch screen. Other user I/O technologies are available as well (e.g., a user headset, a hands-free peripheral, a projector, a printer, and so on).

The memory 84 is intended to represent both volatile storage (e.g., DRAM, SRAM, etc.) and non-volatile storage (e.g., flash memory, magnetic disk drives, etc.). The memory 84 stores a variety of software constructs including an operating system 90 to manage computerized resources of the user endpoint device 22, a set (or suite) of conferencing applications 92 to create and conduct electronic conferences 30 (e.g., a browser, a conferencing client, a special control panel app, etc.), and other memory constructs 94 (e.g., an email application to access email, a calendar or scheduling application to access a calendar, a cellular phone app to operate as a cellular telephone, etc.).

The control circuitry 86 is constructed and arranged to operate in accordance with the various software constructs stored in the memory 84. The control circuitry 86 may be implemented in a variety of ways including via one or more processors (or cores) running specialized software, ASICs, FPGAs and associated programs, discrete components, analog circuits, other hardware circuitry, combinations thereof, and so on. In the context of processing circuitry executing software, a computer program product 98 is capable of delivering all or portions of the software to the user endpoint device 22. The computer program product 98 has a non-transitory (or non-volatile) computer readable medium which stores a set of instructions which controls one or more operations of the user endpoint device 22. Examples of suitable computer readable storage media include tangible articles of manufacture and apparatus which store instructions in a non-volatile manner such as CD-ROM, flash memory, disk memory, tape memory, and the like.

During operation, the control circuitry 86 is capable of executing one or more of the conferencing application 62 to join an electronic conference 30 hosted by the conferencing server 24 (FIG. 2). In particular, while running the conferencing application 62, the control circuitry 86 establishes a connection to the conferencing server 24 through the communications medium 26 (FIG. 1), receives input from a user and conveys that input to the conference server 24 through the connection, and receives output from the conference server 24 through the connection and renders that output to the user.

As mentioned earlier, any user endpoint device 22 may operate as either a sound initiating device or a sound listening device. Additionally, any user endpoint device 22 may operate as a primary device or a helper device.

For example, the control circuitry 86 may be configured by a conferencing application 62 to operate as a primary device enabling the user to actively participate in an electronic conference 30. In this situation, the control circuitry 86 captures audio and video input via the user interface 82 and relays that input to the conference server 24. Additionally, the control circuitry 86 obtains audio and video output from the conference server 24 and presents that output to the user.

As another example, the control circuitry 86 may be configured by the same conferencing application 62 or a different conferencing application 62 (e.g., a special conference control panel application) to operate as a helper device enabling the user to control an electronic conference 30. In this situation, the control circuitry 86 may take advantage of particular components and/or functionality which is not typically available in a general purpose computer or desktop computer. Along these lines, if the user endpoint device 22 has a tablet or a smartphone form factor which includes a touch screen as part of the user interface 82, the control circuitry 86 can display a special control panel on the user interface 82 (e.g., a graphical user interface or GUI). With the special control panel in place, the user is able to enter advanced commands (e.g., individual volume control, video selection, slide show navigation, etc.) to control the operation of the electronic conference 30 (e.g., button presses and parameter selections via easy to find GUI buttons, finger scrolling and swipe gestures with immediate GUI feedback, other navigation operations without need of operating a mouse or keyboard, and so on). Furthermore, the user may be able to more-effectively maneuver a camera or microphone of the user endpoint device 22 during the electronic conference 30 (e.g., to capture a scene or event, to interview someone, etc.). Moreover, due to the wireless nature of the form factor, such operability may take place while the user is standing, walking, changing locations, etc. Further details will now be provided with reference to FIGS. 4 and 5.

Figure 4:
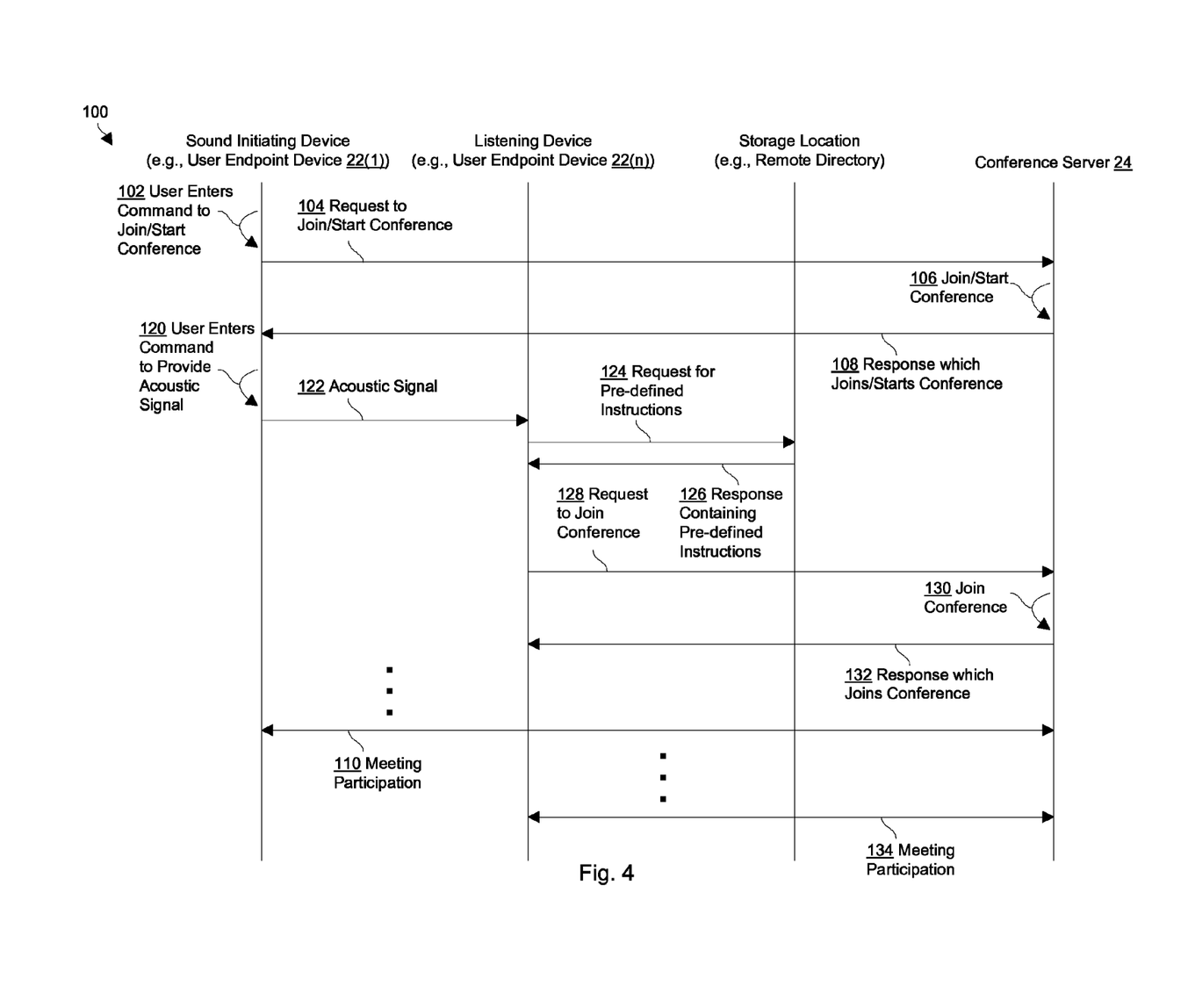
FIG. 4 is a first sequence diagram illustrating communications between various components of the electronic environment in accordance with a first arrangement.
Figure 5:
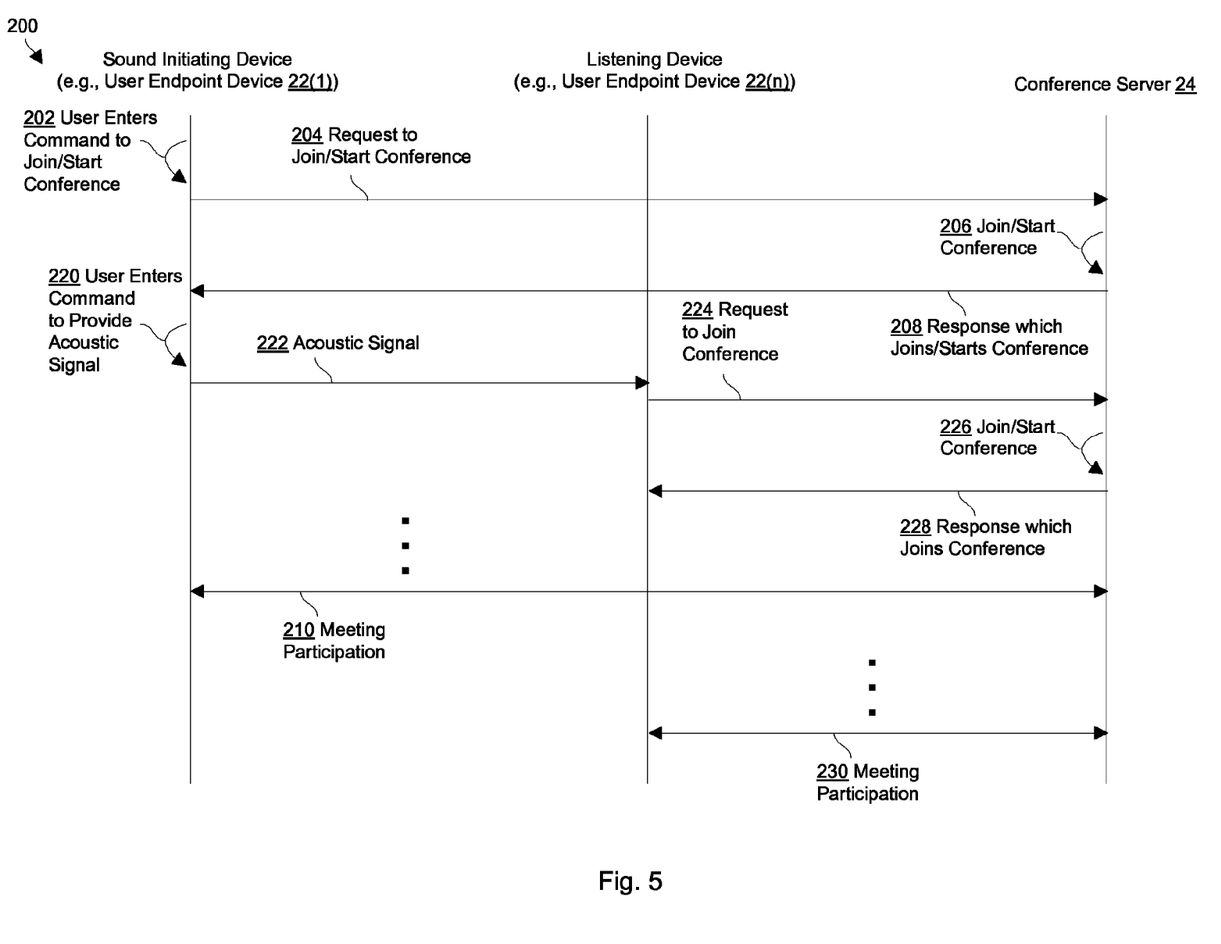
FIG. 5 is a second sequence diagram illustrating communications between various components of the electronic environment in accordance with a second arrangement.

FIGS. 4 and 5 are sequence diagrams showing various operations which involve a helper device (i.e., one of the user endpoint devices 22) joining an electronic conference 30 in response to sound. In particular, FIG. 4 is a first sequence diagram 100 in which the helper device accesses a remote storage location to obtain conference information prior to joining the electronic conference 30 in response to sound. Additionally, FIG. 5 is a second sequence diagram 200 in which the listening device receives conference information from the sound initiating device prior to joining the electronic conference 30 in response to sound.

With reference to FIG. 4, the user initially joins or starts an electronic conference 30 using the sound initiating device (also see the user endpoint device 22(1) in FIG. 1). Along these lines, the user enters a command into the sound initiating device (arrow 102). For example, the user may click on a link of an earlier-received email message or calendar entry of the sound initiating device. As another example, the user many manually enter the command via clicking on buttons and typing in a keyboard to direct a suitable application to join or start the electronic conference 30 (e.g., a browser, an email reader, a conferencing client, and so on).

In response to the command, the sound initiating device sends a conference request to the conference server 24 (arrow 104). The request includes identification information such as a conference ID, a username, validating information, etc.

The conference server 24 then processes the conference request (arrow 106). In particular, the conference server 24 confirms that request is valid (e.g., by accessing a user database, also see the memory constructs 64 in FIG. 2). If the request is to create an electronic conference 30, the conference server 24 allocates appropriate resources to host the conference 30.

The conference server 24 then sends a response back to the sound initiating device informing the sound initiating device that the sound initiating device has joined the electronic conference 30 (arrow 108). At this point, the user is able to participate in the electronic conference 30 using the primary device (represented by the double arrow 110). For example, if the user is the conference creator or presenter, the user is able to control various aspects of the electronic conference 30 such as volume level, displayed content, and so on.

While the electronic conference 30 takes place, the user may wish to join another device to the electronic conference 30. To this end, the user enters a command into the sound initiating device informing the sound initiating device that another device is to be added to the electronic conference 30 (arrow 120). In some arrangements, prior to entering the command in the sound initiating device, the user launches a conferencing application on the other device in order to place the other device in a sound detection mode (e.g., see conferencing applications 92 in FIG. 3).

In response, the sound initiating device outputs an acoustic signal which is received by the helper device (arrow 122). For example, the primary device may play the acoustic signal within audio receiving range of the helper device (also see user endpoint devices 22(1) and 22(n) in FIG. 1).

Upon receipt of the acoustic signal, the listening device sends a request for a set of pre-defined instructions to a storage location (arrow 124). The set of pre-defined instructions identifies the particular details of the electronic conference 30 (e.g., conference ID, username, scheduled time, etc.). If there are multiple electronic conferences 30 scheduled, the particular electronic conference may be identified by a common context shared by the sound initiating device and the listening device such as timestamps in combination with location proximity. That is a lookup server determines which electronic conference 30 the listening device joins based on timestamp and location matches. As an alternative, the lookup server may simply retrieve conference data based on a device ID of the listening device, from a path or designated storage location associated with the listening device, and so on. Other electronic conference selection schemes are suitable for use as well.

The listening device then receives the pre-defined instructions from the storage location (arrow 126). At this point, the helper device is ready to join the electronic conference 30. Accordingly, the listening device sends a conference request to the conference server 24 (arrow 128). The request includes conference identification information such as a conference ID, a username, validating information, and so on.

The conference server 24 then processes the conference request (arrow 130). In particular, the conference server 24 confirms that request is valid (e.g., by accessing a user database, also see the memory constructs 64 in FIG. 2) and confirms that the electronic conference 30 is currently active.

The conference server 24 then sends a response back to the listening device informing the listening device that the listening device has joined the electronic conference 30 (arrow 132). At this point, the user is able to participate in the electronic conference 30 using the listening device (see the double arrow 134). For example, in the context of a joining helper device, the user may now control the electronic conference 30 via a touch screen control panel of the helper device. As another example, the user may leverage particular components of the helper device to augment the electronic conference 30 such as the microphone, the camera, and so on.

The above described scenario, as shown by sequence diagram 100, is well suited for situations in which conference details are stored in a manner which is conveniently accessible by the helper device. Such a scenario also alleviates the need for the primary device to provide the conference details. Rather, the primary device may simply output the acoustic signal to automatically direct the helper device to access conference details from the storage location.

In some arrangements, the storage location resides at a scheduling server which compares timestamps (e.g., a current time to times of scheduled conferences) and selects a particular conference among multiple scheduled conferences. Such a scheduling server may reside within the helper device, within the conference server 24, or within a separate external apparatus.

Once the appropriate electronic conference 30 is identified, the helper device joins that electronic conference 30. Such operation is less burdensome than alternatives which require the user to manually look-up and enter conference details or send new invites to the helper device through a computer network.

However, in connection with the sequence diagram 200 in FIG. 5, as an alternative to the situation described in FIG. 4, the primary device may include some or all of the conference details within the acoustic signal. In particular, and with reference now to FIG. 5, the user initially joins (or starts) an electronic conference 30 using the sound initiating device (also see the user endpoint device 22(1) in FIG. 1). That is, the user enters a command into the sound initiating device (arrow 202). As mentioned earlier in connection with sequence diagram 100 (FIG. 4), the user may click on a link of an earlier-received email message or calendar entry of the sound initiating device, the user many manually enter the command via clicking on buttons and typing in a keyboard to direct a suitable application to join or start the electronic conference 30, and so on.

In response to the command, the sound initiating device sends a conference request to the conference server 24 (arrow 204). The request includes identification information such as a conference ID, a username, validating information, etc.

The conference server 24 then processes the conference request (arrow 206). In particular, the conference server 24 confirms that request is valid (e.g., by accessing a user database, also see the memory constructs 64 in FIG. 2). If the request is to create an electronic conference 30, the conference server 24 allocates appropriate resources to host the conference 30.

The conference server 24 then sends a response back to the sound initiating device informing the sound initiating device that the sound initiating device has joined the electronic conference 30 (arrow 208). At this point, the user is able to participate in the electronic conference 30 using the primary device (see the double arrow 210). For example, if the user is the conference creator or presenter, the user is able to control various aspects of the electronic conference 30 using the primary device such as volume level, displayed content, and so on.

While the electronic conference 30 takes place, the user joins the listening device to the electronic conference 30. To this end, the user enters a command into the sounding initiating device informing the sound initiating device that another device is to be added to the electronic conference 30 (arrow 220). In some arrangements, prior to entering the command in the primary device, the user launches a conferencing application on the listening device in order to place the listening device in a sound detection mode.

In response, the sound initiating device outputs an acoustic signal which is received by the listening device (arrow 222). For example, the sound initiating device may play the acoustic signal within audio receiving range of the helper device (also see user endpoint devices 22(1) and 22(n) in FIG. 1). The acoustic signal includes some or all of the conference details required for the listening device to join the electronic conference 30. In some arrangements, the listening device simply generates a new conference request based on the conference details included within the acoustic signal. In other arrangements, the listening device includes additional information in the new conference request (e.g., locally stored device information, remotely stored data, etc.). For example, the acoustic signal may include a command to transfer control of the electronic conference 30 from the primary device to the helper device as soon as the listening device has joined the electronic conference 30.

Next, the listening device sends the conference request to the conference server 24 (arrow 224). The request includes conference details such as a conference ID, a username, validating information, and so on.

The conference server 24 then processes the conference request (arrow 226). In particular, the conference server 24 confirms that request is valid (e.g., by accessing a user database, also see the memory constructs 64 in FIG. 2) and confirms that the electronic conference 30 is currently active.

The conference server 24 then sends a response back to the listening device informing the listening device that the listening device has joined the electronic conference 30 (arrow 228). At this point, the user is able to participate in the electronic conference 30 using the listening device (see the double arrow 230). For example, the user may now control the electronic conference 30 via a touch screen control panel of the listening device. As another example, the user may leverage particular components of the helper device to augment the electronic conference 30 such as the microphone, the camera, and so on. Further details will now be provided with reference to FIG. 6.

Figure 6:
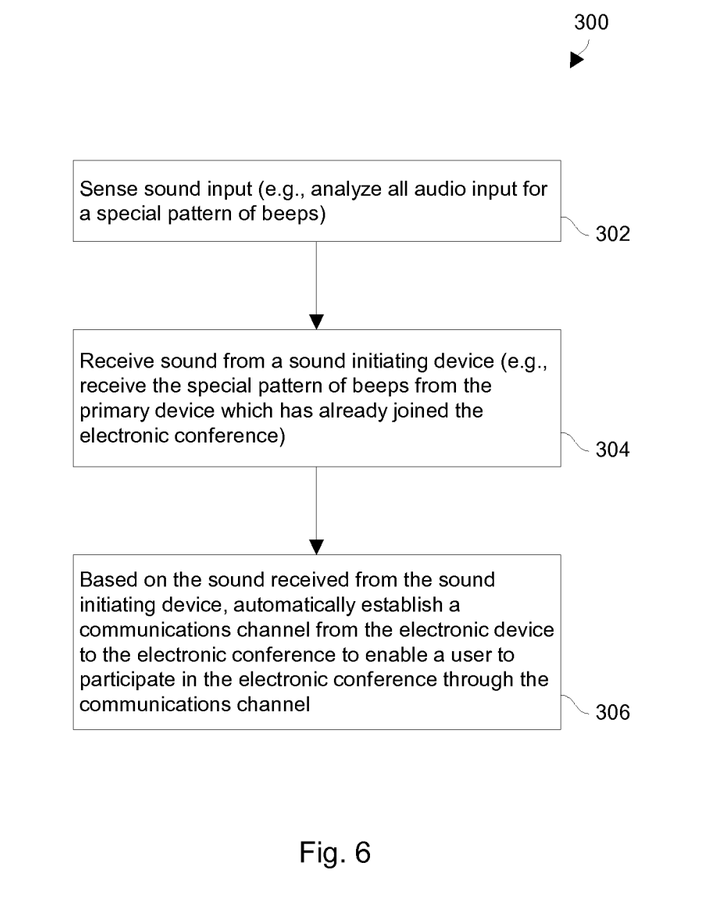
FIG. 6 is a flowchart of a procedure which is performed by the user endpoint device when joining an electronic conference in response to sound.

FIG. 6 is a flowchart of a procedure 300 which is performed by a user endpoint device 22 when operating as a listening device which joins an electronic conference 30 in response to sound. Although any type of computing device can be a listening device, wireless devices with touch screens, microphones, cameras, etc. are particular well suited as a helper device since such devices possess components which augment features provided by a standard primary device such as a general purpose computer.

In step 302, the listening device senses sound input. For example, the user may launch a special application on the helper device which places the helper device in a detection mode awaiting receipt of the acoustic signal 40 (see the set of conferencing applications 92 in FIG. 3).

In step 304, the listening device receives sound from a sound initiating device. Along these lines, a user endpoint device 22 that has already joined (or started) the electronic conference 30 can output the acoustic signal 40 so that it is detected by the helper device which is operating in detection mode.

In step 306, the listening device, based on the sound received from the sound initiating device, automatically establishes a communications channel to the electronic conference 30 hosted by the conference server 24 to enable the user to participate in the electronic conference 30 using the helper device. Once the listening device has joined the electronic conference 30, the listening device transitions from detection mode to conference mode enabling the user to participate in the electronic conference 30. In some arrangements, the listening device is a tablet apparatus or smartphone, and the user operates the listening device as a control panel to control aspects of the electronic conference 30.

As described above, improved techniques are directed to joining an electronic device to an electronic conference 30 using sound. In particular, a sound initiating device such as a user endpoint device 22 which has already joined the electronic conference 30 can output an acoustic signal 40 to a listening device (e.g., a tablet, a smart phone, a laptop, etc.). In response to the acoustic signal 40, the listening device can automatically join the electronic conference 30 to facilitate meeting operation (e.g., to operate as a detached control panel, to capture audio or video, etc.). For example, suppose that a user currently connects to an electronic conference using a primary device such as a general purpose computer, but that the user wishes to take advantage of certain features that are not available on the primary device but are available on a helper device such as a smart phone or a tablet. For instance, the user may run a special control panel application on the helper device which automatically assumes control of the electronic conference 30 and enables the user to take advantage of various specialized features of the helper device (e.g., a touch pad, a camera, wireless mobility, etc.) that may not be available on the primary device. Such joining via sound simplifies the process of including a new device with the electronic conference 30, and enables a user to make use of various components of the helper device to enhance the overall experience (e.g., ergonomics of a touch pad to control aspects of the electronic conference, mobility of a smart phone camera to capture images, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that the acoustic signal 40 may take a variety of forms such as varying audio tones, patterns of the same tone, combinations of signals which change in amplitude and frequency, and so on. Additionally, other types of localized wireless communications may be substituted for the acoustic signal 40 such as radio signals (e.g., Bluetooth, etc.), infrared signals, light pulses, laser, combinations thereof, and so on.

Additionally, it should be understood that the sound initiating device may operate as either a primary device or a helper device during an electronic conference. Likewise, the listening device may operate as either a primary device or a helper device during an electronic conference.

Furthermore, in some arrangements, the listening device provides sound back to the sound initiating device, i.e., for bidirectional communications. Moreover, the user is able to replay sounds in either direction to ensure proper receipt and processing of the sounds. Such modifications and enhancements are intended to belong to various embodiments of the disclosure.

What is claimed is:

1. A method of joining an electronic device to an electronic conference hosted by a conference server, the method comprising:

sensing, by the electronic device, sound input;

receiving, by the electronic device, sound from a sound initiating device; and based on the sound received from the sound initiating device, automatically establishing a communications channel from the electronic device to the electronic conference hosted by the conference server to enable a user of the electronic device to participate in the electronic conference through the communications channel by using the electronic device;

wherein receiving the sound from the sound initiating device includes:

receiving an acoustic signal from the sound initiating device, the acoustic signal including a sequence of audio tones;

wherein the conference server is constructed and arranged to manage multiple electronic conferences simultaneously, each electronic conference (i) connecting together a respective group of users and (ii) being uniquely identified by a meeting identifier;

wherein establishing the communications channel from the electronic device to the electronic conference hosted by the conference server includes:

in response to the acoustic signal which includes the sequence of audio tones, querying a scheduling server to obtain a particular meeting identifier which identifies a particular electronic conference, and providing, to the conference server, a join meeting command which includes the particular meeting identifier to direct the conference server to join the electronic device to the particular electronic conference among the multiple electronic conferences based on the particular meeting identifier;

wherein querying the scheduling server to obtain the particular meeting identifier includes:

providing a user identifier and a timestamp from the electronic device to the scheduling server;

wherein the user identifier identifies a particular user among multiple users;

wherein the timestamp identifies a particular meeting time;

wherein the scheduling server accesses a particular meeting schedule for the particular user based on the user identifier; and wherein the scheduling server (i) selects a particular scheduled meeting from multiple scheduled meetings on the particular meeting schedule based on a comparison between the timestamp and the multiple scheduled meetings on the particular meeting schedule and (ii) provides the particular meeting identifier back to the electronic device, the particular meeting identifier identifying the particular scheduled meeting among the multiple scheduled meetings.

2. A method as in claim 1 wherein the electronic conference is an online meeting; wherein the sound initiating device is a first meeting endpoint device of the online meeting; and wherein establishing the communications channel from the electronic device to the electronic conference hosted by the conference server includes:

joining the electronic device as a second meeting endpoint device of the online meeting, each meeting endpoint device exchanging electronic signals with the conference server during the online meeting.

3. A method as in claim 2 wherein the first meeting endpoint device includes an electronic display which outputs a presentation of the online meeting; wherein the second meeting endpoint device includes a touch screen; and wherein the method further comprises:

obtaining user commands via the touch screen of the second meeting endpoint device to control the presentation of the online meeting output on the electronic display of the first meeting endpoint device.

4. A method as in claim 2 wherein the first meeting endpoint device includes an electronic display which outputs a presentation of the online meeting; wherein the second meeting endpoint device includes a camera; and wherein the method further comprises:

capturing a set of images using the camera of the second meeting endpoint device, and including the set of images in the presentation of the online meeting output on the electronic display of the first meeting endpoint device.

5. A method as in claim 2 wherein the first meeting endpoint device communicates with the conference server through a first network connection; and wherein joining the electronic device as the second meeting endpoint device of the online meeting includes:

creating, as the communications channel between the electronic device and the conference server, a second network connection that is independent of the first network connection.

6. A method as in claim 1 wherein receiving the acoustic signal from the sound initiating device includes:

prior to establishing the communications channel based on the sound received from the sound initiating device, acquiring a sound wave signal which is projected by the sound initiating device to the electronic device through ambient air.

7. A method as in claim 6 wherein acquiring the sound wave signal which is projected by the sound initiating device to the electronic device through the ambient air includes:

acoustically sensing the sound wave signal using a microphone of the electronic device, the sound wave signal having been produced by a speaker of the sound initiating device.

8. A method as in claim 1 wherein, prior to receiving the sound from the sound initiating device, the sound initiating device participates as a user endpoint in the particular electronic conference; and wherein the method further comprises:

after receiving the sound from the sound initiating device, playing a sequence of beeps from the electronic device to the sound initiating device to provide bidirectional communications between the electronic device and the sound initiating device.

9. An electronic device, comprising:

a user interface;

a communications interface;

memory; and control circuitry coupled to the user interface, the communications interface and the memory; the memory storing instructions which, when carried out by the control circuitry, cause the control circuitry to:

receive sound from a sound initiating device through the user interface, and based on the sound received from the sound initiating device, establish a communications channel from communications interface of the electronic device to an electronic conference hosted by a conference server to enable a user of the electronic device to participate in the electronic conference through the communications channel by using the electronic device;

wherein the control circuitry, when receiving the sound from the sound initiating device, is constructed and arranged to:

receive an acoustic signal from the sound initiating device, the acoustic signal including a sequence of audio tones;

wherein the conference server is constructed and arranged to manage multiple electronic conferences simultaneously, each electronic conference (i) connecting together a respective group of users and (ii) being uniquely identified by a meeting identifier;

wherein the control circuitry, when establishing the communications channel, is constructed and arranged to:
  in response to the acoustic signal which includes the sequence of audio tones, query a scheduling server to obtain a particular meeting identifier which identifies a particular electronic conference, and
  provide, to the conference server, a join meeting command which includes the particular meeting identifier to direct the conference server to join the electronic device to the particular electronic conference among the multiple electronic conferences based on the particular meeting identifier;

wherein the control circuitry, when querying the scheduling server, is constructed and arranged to:
  provide a user identifier and a timestamp from the electronic device to the scheduling server;

wherein the user identifier identifies a particular user among multiple users;

wherein the timestamp identifies a particular meeting time;

wherein the scheduling server accesses a particular meeting schedule for the particular user based on the user identifier; and wherein the scheduling server (i) selects a particular scheduled meeting from multiple scheduled meetings on the particular meeting schedule based on a comparison between the timestamp and the multiple scheduled meetings on the particular meeting schedule and (ii) provides the particular meeting identifier back to the electronic device, the particular meeting identifier identifying the particular scheduled meeting among the multiple scheduled meetings.

10. An electronic device as in claim 9 wherein the electronic conference is an online meeting; wherein the sound initiating device is a first meeting endpoint device of the online meeting; and wherein the control circuitry, when establishing the communications channel from the electronic device to the electronic conference hosted by the conference server, is constructed and arranged to:
  join the electronic device as a second meeting endpoint device of the online meeting, each meeting endpoint device exchanging electronic signals with the conference server during the online meeting.

11. An electronic device as in claim 10 wherein the first meeting endpoint device includes an electronic display which outputs a presentation of the online meeting; wherein the second meeting endpoint device includes a touch screen; and wherein the control circuitry is further constructed and arranged to:
  obtain user commands via the touch screen of the second meeting endpoint device to control the presentation of the online meeting output on the electronic display of the first meeting endpoint device.

12. An electronic device as in claim 10 wherein the first meeting endpoint device includes an electronic display which outputs a presentation of the online meeting; wherein the second meeting endpoint device includes a camera; and wherein the control circuitry is further constructed and arranged to:
  capture a set of images using the camera of the second meeting endpoint device, and include the set of images in the presentation of the online meeting output on the electronic display of the first meeting endpoint device.

13. An electronic device as in claim 10 wherein the first meeting endpoint device communicates with the conference server through a first network connection; and wherein the control circuitry, when joining the electronic device as the second meeting endpoint device of the online meeting, is constructed and arranged to:
  create, as the communications channel between the electronic device and the conference server, a second network connection that is independent of the first network connection.

14. An electronic device as in claim 9 wherein the control circuitry, when receiving the acoustic signal from the sound initiating device, is constructed and arranged to:
  prior to establishing the communications channel based on the sound received from the sound initiating device, acquire a sound wave signal which is projected by the sound initiating device to the electronic device through ambient air.

15. An electronic device as in claim 14 wherein the control circuitry, when acquiring the sound wave signal which is projected by the sound initiating device to the electronic device through the ambient air, is constructed and arranged to:
  acoustically sense the sound wave signal using a microphone of the electronic device, the sound wave signal having been produced by a speaker of the sound initiating device.

16. A computer program product having a non-transitory computer readable medium which stores a set of instructions to join an electronic device to an electronic conference hosted by a conference server; the set of instructions, when carried out by computerized circuitry of the electronic device, causing the computerized circuitry to perform a method of:
  sensing sound input;
  receiving sound from a sound initiating device; and
  based on the sound received from the sound initiating device, automatically establishing a communications channel from the electronic device to the electronic conference hosted by the conference server to enable a user of the electronic device to participate in the electronic conference through the communications channel by using the electronic device;

wherein receiving the sound from the sound initiating device includes:
  receiving an acoustic signal from the sound initiating device, the acoustic signal including a sequence of audio tones;

wherein the conference server is constructed and arranged to manage multiple electronic conferences simultaneously, each electronic conference (i) connecting together a respective group of users and (ii) being uniquely identified by a meeting identifier;

wherein establishing the communications channel from the electronic device to the electronic conference hosted by the conference server includes:
  in response to the acoustic signal which includes the sequence of audio tones, querying a scheduling server to obtain a particular meeting identifier which identifies a particular electronic conference, and
  providing, to the conference server, a join meeting command which includes the particular meeting identifier to direct the conference server to join the electronic device to the particular electronic conference among the multiple electronic conferences based on the particular meeting identifier;

wherein querying the scheduling server to obtain the particular meeting identifier includes:

providing a user identifier and a timestamp from the electronic device to the scheduling server;

wherein the user identifier identifies a particular user among multiple users;

wherein the timestamp identifies a particular meeting time;

wherein the scheduling server accesses a particular meeting schedule for the particular user based on the user identifier; and wherein the scheduling server (i) selects a particular scheduled meeting from multiple scheduled meetings on the particular meeting schedule based on a comparison between the timestamp and the multiple scheduled meetings on the particular meeting schedule and (ii) provides the particular meeting identifier back to the electronic device, the particular meeting identifier identifying the particular scheduled meeting among the multiple scheduled meetings.

17. A computer program product as in claim 16 wherein the electronic conference is an online meeting; wherein the sound initiating device is a first meeting endpoint device of the online meeting; and wherein establishing the communications channel from the electronic device to the electronic conference hosted by the conference server includes:

joining the electronic device as a second meeting endpoint device of the online meeting, each meeting endpoint device exchanging electronic signals with the conference server during the online meeting.

18. A computer program product as in claim 17 wherein the first meeting endpoint device includes an electronic display which outputs a presentation of the online meeting; wherein the second meeting endpoint device includes a touch screen; and wherein the method further comprises:

obtaining user commands via the touch screen of the second meeting endpoint device to control the presentation of the online meeting output on the electronic display of the first meeting endpoint device.

19. A computer program product as in claim 17 wherein the first meeting endpoint device includes an electronic display which outputs a presentation of the online meeting; wherein the second meeting endpoint device includes a camera; and wherein the method further comprises:

capturing a set of images using the camera of the second meeting endpoint device, and including the set of images in the presentation of the online meeting output on the electronic display of the first meeting endpoint device.

20. A computer program product as in claim 17 wherein the first meeting endpoint device communicates with the conference server through a first network connection; and wherein joining the electronic device as the second meeting endpoint device of the online meeting includes:

creating, as the communications channel between the electronic device and the conference server, a second network connection that is independent of the first network connection.

21. A computer program product as in claim 16 wherein receiving the acoustic signal from the sound initiating device includes:

prior to establishing the communications channel based on the sound received from the sound initiating device, acquiring a sound wave signal which is projected by the sound initiating device to the electronic device through ambient air.

22. A computer program product as in claim 21 wherein acquiring the sound wave signal which is projected by the sound initiating device to the electronic device through the ambient air includes:

acoustically sensing the sound wave signal using a microphone of the electronic device, the sound wave signal having been produced by a speaker of the sound initiating device.

* * * * *